Figure 1:
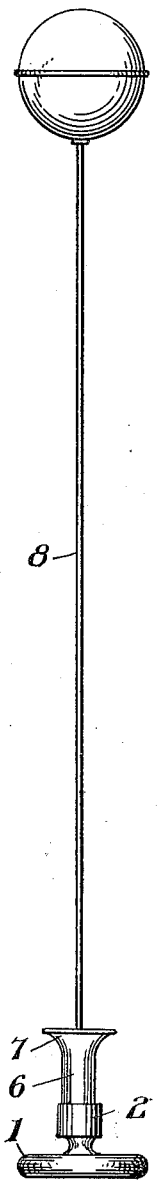

J. KUBICEK.
HAT PIN POINT PROTECTOR.
APPLICATION FILED JAN. 20, 1912.

1,023,663.

Patented Apr. 16, 1912.

WITNESSES

INVENTOR
J. Kubicek
BY
ATTORNEYS

UNITED STATES PATENT OFFICE.

JOSEF KUBICEK, OF PRAGUE, OKLAHOMA.

HAT-PIN-POINT PROTECTOR.

1,023,663.  Specification of Letters Patent.  Patented Apr. 16, 1912.

Application filed January 20, 1912. Serial No. 672,294.

*To all whom it may concern:*

Be it known that I, JOSEF KUBICEK, a subject of the Emperor of Austria-Hungary, residing at Prague, in the county of Lincoln and State of Oklahoma, have invented certain new and useful Improvements in Hat-Pin-Point Protectors, of which the following is a specification, reference being had therein to the accompanying drawing.

This invention relates to a hatpin point protector, and my invention aims to provide a novel device that can be easily and quickly mounted upon the pointed end of a pin to protect the pointed end of the pin, also to prevent the pin from becoming accidentally displaced relatively to a hat.

My invention further aims to accomplish the above result by a device consisting of comparatively few parts easily assembled and highly efficient for the purposes for which it is intended.

My invention will be hereinafter specifically described and then claimed, and reference will now be had to the drawing, wherein:—

Figure 2:
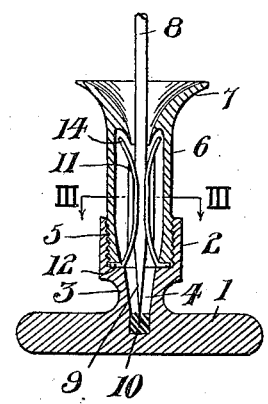
Figure 3:
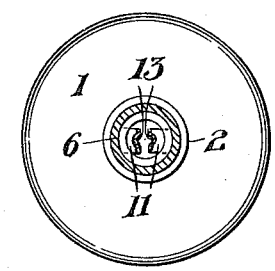
Figure 4:
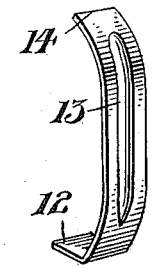

Figure 1 is a side elevation of a pin provided with the device, Fig. 2 is an enlarged longitudinal sectional view of the device, Fig. 3 is a cross sectional view taken on the line III—III of Fig. 2, and Fig. 4 is a perspective view of a detached gripping member.

A hatpin point protector in accordance with this invention comprises a head 1 provided with a central integral cup 2, said cup being connected to the head 1 by a neck 3 that has a tapering socket 4 extending into the head 1 with the open end of the socket in communication with the cup 2. The inner walls of the cup 2 are screw threaded, as at 5 to receive the exteriorly screw threaded end of a sleeve 6, said sleeve having the opposite end thereof provided with a funnel-shaped mouthpiece 7 that extends into the sleeve 6. The funnel-shaped mouthpiece 7 facilitates placing the device upon the pointed end of a pin 8 and the point 9 of said pin is adapted to enter a piece of yieldable material 10 located in the inner end of the socket 4. The piece of yieldable material 10 is preferably made of rubber or cork.

Located within the sleeve 6 are two diametrically opposed resilient gripping members 11 having the inner ends thereof bent, as at 12 to engage the bottom of the cup 2, and the inner end of the sleeve 6 is adapted to anchor the ends of the members 11 within the cup 2, whereby said members will be correctly positioned within the sleeve 6. The confronting faces of the members 11 are provided with longitudinal depressed portions or grooves 13 to receive the pin 8, said depressed portions gripping a larger portion of the pin 8 than if the members 11 are not provided with said depressed portions.

When the device is removed from the pointed end of the pin 8, the members 11 immediately contact, but the flared ends 14 of said members permit of the pointed end of the pin easily riding between the members to enter the socket 4.

From the foregoing it will be observed that the hatpin point protector comprises four metallic parts that can be easily and quickly assembled, and with the device upon the pointed end of the pin, it is impossible for pedestrians to be injured by contacting with the pin.

The head 1 of the device is susceptible to any desired ornamentation and can be made to harmonize with the head of the pin 8.

What I claim is:—

A hatpin point protector comprising a head, a cup located centrally thereof and having the inner walls thereof screw threaded, a sleeve screwed in said cup and having the outer end thereof provided with a funnel-shaped mouthpiece adapted to receive the pointed end of a pin, and diametrically opposed longitudinally grooved resilient members having the inner ends thereof anchored upon the bottom of said cup by the threaded end of said sleeve and adapted to retain the pointed end of a hatpin within said sleeve.

In testimony whereof I affix my signature in the presence of two witnesses.

JOSEF KUBICEK.

Witnesses:
JOHN ZAVADIL,
FRANK SVOBODA.

Copies of this patent may be obtained for five cents each, by addressing the "Commissioner of Patents, Washington, D. C."